United States Patent
Tanikawa

(10) Patent No.: US 7,512,318 B2
(45) Date of Patent: Mar. 31, 2009

(54) APPARATUS AND METHOD WHICH ENABLES FULLY RECORDING A FRAGMENTED PROGRAM EVEN WITH AN OPERATION AFTER INITIAL FEW AIRINGS

(75) Inventor: Toshiro Tanikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 721 days.

(21) Appl. No.: 11/080,669

(22) Filed: Mar. 16, 2005

(65) Prior Publication Data

US 2005/0271363 A1   Dec. 8, 2005

(30) Foreign Application Priority Data

Mar. 26, 2004   (JP)   ............................. 2004-092347

(51) Int. Cl.
*H04N 5/76*   (2006.01)
(52) U.S. Cl. .......................................... 386/83; 725/38
(58) Field of Classification Search ................... 386/83; 725/39, 45, 46, 38
See application file for complete search history.

(56) References Cited

U.S. PATENT DOCUMENTS

2002/0110360 A1*   8/2002   Potrebic ....................... 386/83
2006/0179462 A1*   8/2006   Willame et al. ................ 725/90

FOREIGN PATENT DOCUMENTS

| JP | 2000-175141 A | 6/2000 |
| JP | 2002-300484 A | 10/2002 |
| JP | 2003-32592 A | 1/2003 |
| JP | 2003-134428 A | 5/2003 |
| JP | 2003-309787 A | 10/2003 |
| JP | 2004-86288 A | 3/2004 |

* cited by examiner

*Primary Examiner*—David E Harvey
(74) *Attorney, Agent, or Firm*—Foley & Lardner LLP

(57) ABSTRACT

A broadcast storage unit 1, which receives a program to be broadcasted digitally and records the program, includes a DeMUX processing unit 12 that acquires program information concerning a program to be broadcasted, an SI information analyzing unit 15 that extracts information on a new program from the acquired program information, a recording condition setting unit 21 that reserves the new program for recording based on the extracted program information, and a storing unit 17 that records the new program that is reserved for recording.

14 Claims, 4 Drawing Sheets

APPARATUS AND METHOD WHICH ENABLES FULLY RECORDING A FRAGMENTED PROGRAM EVEN WITH AN OPERATION AFTER INITIAL FEW AIRINGS

BACKGROUND OF THE INVENTION

1) Field of the Invention

The present invention relates to a storage unit and a storage method for storing broadcasts.

2) Description of the Related Art

Conventionally, in reservation for recording of a television program or the like, a user inputs a channel of a program, which the user wishes to reserve for recording, a recording starting date and time, and the like to a video recorder based on a broadcast schedule or the like of television programs appeared on a newspaper or a magazine or inputs a G code of the program, which the user wishes to reserve for recording, to the video recorder. In addition, a video recorder or the like learns preferences of a user (a viewer of programs) based on states of use of the video recorder or the like by the user and automatically records television programs identical with or similar to the preferences of the user.

Incidentally, in recent years, an Electronic Program Guide (EPG) has been spread rapidly. A viewer can perform recording reservation of television programs based on the EPG by causing a video recorder or the like to receive the EPG.

A broadcast video automatic recording apparatus described in Japanese Patent Application Laid-Open No. 2000-175141 includes a unit for storing a search keyword designated by a user in advance and a unit for collecting program information concerning broadcast videos. The broadcast video automatic recording apparatus automatically selects a program to be an object of recording by collating the designated search keyword and the collected program information and controls a receiver to accumulate received videos of the recording object program in an image file.

According to the conventional technique, it is possible to automatically record a program based on a designated keyword. However, when a program to be broadcasted is a new program in an unprecedented new genre, it is difficult to designate a keyword that coincides with program information of the program in the new genre. Thus, the program is hardly regarded as a recording object. Therefore, it is likely that a program desired by a user cannot be recorded.

Popularity of a serial or the like to be started anew tends to be determined after a first few episodes are broadcasted. Therefore, for example, when a user is informed of the serial by an acquaintance or the like after a first few episodes of the serial are broadcasted, the user can only watch the serial from the middle episode.

SUMMARY OF THE INVENTION

The invention has been devised in view of the problems and it is an object of the invention to obtain a storage unit that is capable of automatically recording a new program that is broadcasted over plural times.

A program recording apparatus according to one aspect of the present invention includes an information acquiring unit that acquires program information concerning a program to be broadcasted; an information extracting unit that extracts information indicating whether the program is a new program from the program information acquired; a program reserving unit that performs, when the program is a new program, a recording reservation for the program, based on the information extracted; and a storage control unit that stores the program, for which the recording reservation is performed, in a storage medium.

A program recording method according to another aspect of the present invention includes acquiring program information concerning a program to be broadcasted; extracting information indicating whether the program is a new program from the program information acquired; performing, when the program is a new program, a recording reservation for the program, based on the information extracted; and storing the program, for which the recording reservation is performed, in a storage medium.

The other objects, features, and advantages of the present invention are specifically set forth in or will become apparent from the following detailed description of the invention when read in conjunction with the accompanying drawings.

DETAILED DESCRIPTION

Figure 1:
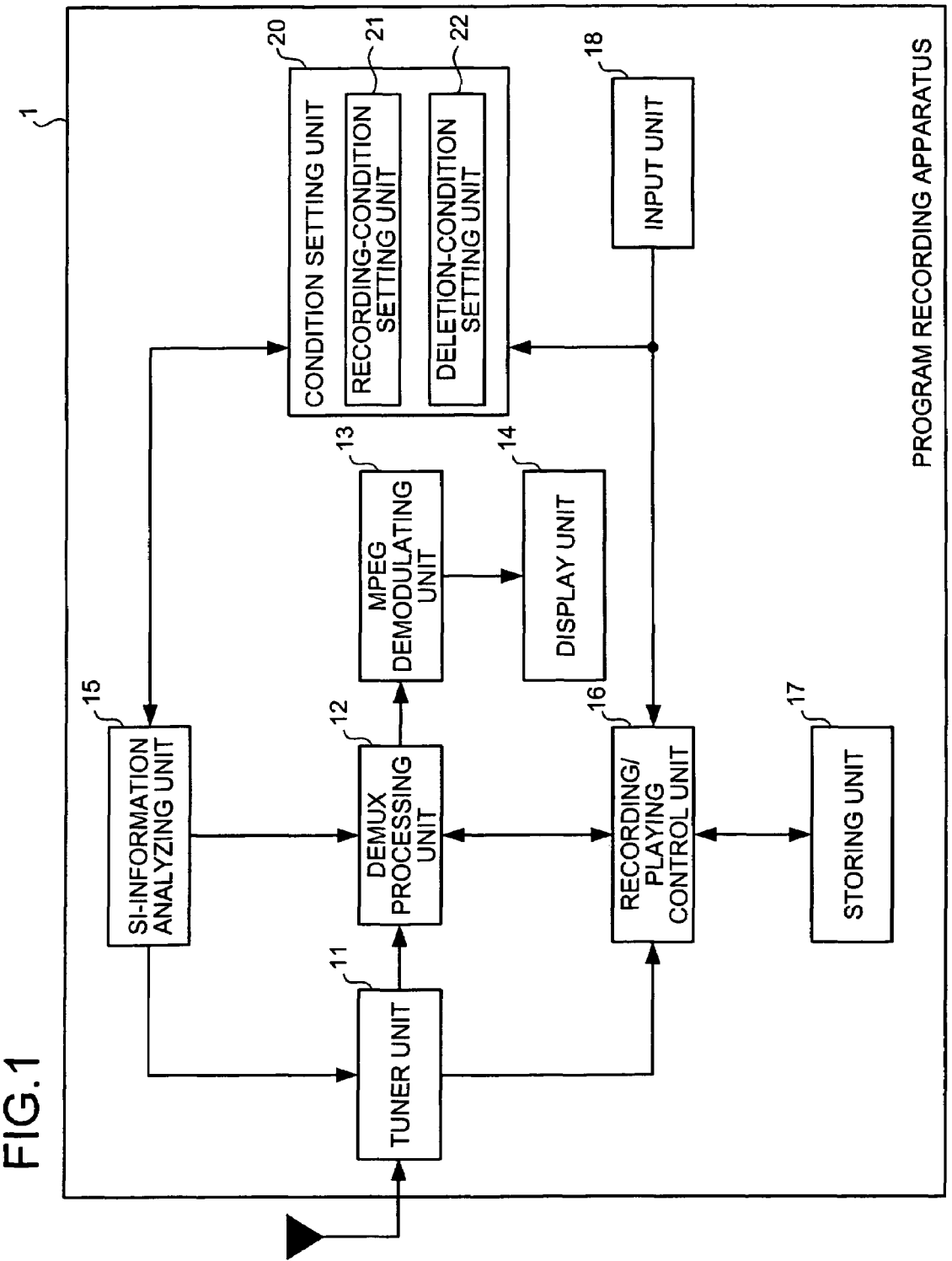
FIG. 1 is a block diagram of a structure of a broadcast storage unit according to a first example of the invention.

Exemplary embodiments of a broadcast storage unit (a storage unit) according to the invention are explained in detail below. Note that the invention is not limited by the embodiments. In the following description, an outline and characteristics of the broadcast storage unit of the invention are explained as an embodiment and, then, examples of the broadcast storage unit are explained.

A rating of a program, which is broadcasted over plural times, changes according to information on popularity of the program and a degree of attention by the media, rumors from acquaintances, and the like. Therefore, a viewer often wishes to view this program after the program is broadcasted for a predetermined number of times.

However, after the program, which is broadcasted over plural times, is broadcasted for the predetermined number of times, when the viewer starts viewing the program, the viewer wishes to view broadcasts, which the viewer missed, because the viewer can only view the program from the middle. Among programs that are broadcasted over plural times, concerning a serial that is broadcasted serially (e.g., one episode is broadcasted every week). In particular, the viewer desires to view the program from a first episode.

Thus, the broadcast storage unit in this embodiment automatically records (stores) broadcasts for first predetermined number of times in a new program that is broadcasted over plural times. The broadcast storage unit is a unit that receives digital broadcast waves and stores video data and voice data. The broadcast storage unit automatically records first predetermined number of broadcasts in a new program, which is broadcasted over plural times, based on service information (SI) and an Electronic Program Guide (EPG).

As digital broadcasts, for example, there are a Broadcasting Satellite (BS) digital broadcast, a communications satellite (CS) digital broadcast, a ground wave digital broadcast, a digital Community Antenna TeleVision (CATV), and a BS radio (a digital voice broadcast).

The SI is data describing information on programs to be broadcasted and services (an electronic program guide) and is used in receiving programs selectively. As the SI, there are all-station SI that is sent commonly by respective broadcasting companies and individual-station SI that is sent by each broadcasting company. As information included in the SI, there are a channel number of a program present in a Transport Stream (TS), a channel name of the program, a program name, a broadcast date and time of the program, the number of total broadcast times in case of a serial program, the number of times a program is broadcasted in a serial program, a type of a program, an explanation of program contents, and the like. For example, when a program is a serial that is broadcasted once a week for ten weeks serially, the SI includes an indication that, for example, the total number of times of broadcast is ten and this is the first time.

The EPG is data of an electronic program guide or the like. It is possible to display a program table on a screen of a television or the like with the EPG. With the EPG, as in the case of the SI, it is possible to acquire information such as a channel number of a program, a channel name of the program, a program name, a broadcast date and time of the program, the total number of times of broadcast in the case of a serial program, the number of times a program is broadcasted in the serial program, and a type of the program. In the EPG, there is a system for sending a program table data at intervals of electronic waves or the like of a broadcasted program and a system for sending a program table data through the Internet. For example, there is an iEPG that acquires program table data through the Internet.

The broadcast storage unit is set to extract a new program, which is broadcasted over plural times, based on the SI or the EPG and reserve to record the extracted new program. The program to be reserved for recording is recoded only for first predetermined number of times of the program to be broadcasted over plural times, whereby a load of program storage (recording) is reduced. When a capacity of the broadcast storage unit for storing programs runs short, programs are deleted based on a condition that, for example, a program is recorded by automatic recording, a program to be broadcasted over plural times that is allowed to be deleted if the number of times of recording or a storage capacity for the program decreases when the program is recorded without being watched even once. When a program is deleted, a priority for deletion is set.

In this way, according to this embodiment, a broadcast for the first predetermined number of times of a new program, which is broadcast over plural times, is recorded based on the SI or the EPG. Thus, a viewer can view the broadcast for the first predetermined number of times that the viewer missed. Consequently, even when a program, which is broadcasted over plural times, is a serial, it is possible to view all the broadcasted episodes in an order of the episodes.

FIG. 1 is a block diagram of a structure of a broadcast storage unit according to a first example of the invention. A broadcast storage unit 1 is a unit that receives digital broadcast waves and records video data and voice data. The broadcast storage unit 1 includes a tuner unit 11, a Demulti-plexer (DeMUX) processing unit (an information acquiring unit) 12, a Motion Picture Expert Group (MPEG) demodulating unit 13, a display unit 14, an SI information analyzing unit (an information extracting unit) 15, a recording/reproduction control unit 16, a storing unit (a storage medium) 17, an input unit 18, and a condition setting unit 20. Note that the recording/reproduction control unit 16 includes, for example, a CPU and software controlled by the CPU. The recording/reproduction control unit 16 corresponds to a storage control unit, a deletion control unit, a judging unit, a first detection unit, and a second detection unit described in claims.

The tuner unit 11 selects and receives a signal of a predetermined frequency based on instruction information from the SI information analyzing unit 15 and instruction information from the recording/reproduction control unit 16 and extracts a TS. The tuner unit 11 demodulates the extracted TS and corrects a bit error and, then, sends this TS to the DeMUX processing unit 12 and the recording/reproduction control unit 16. When a received program is reproduced, the tuner unit 11 transmits a TS of the program to the DeMUX processing unit 12. When a received program is recorded, the tuner unit 11 transmits a TS to the recording/reproduction control unit 16.

When plural streams such as videos and voices are multiplexed in a multiplexer (not shown) on a transmission side for transmitting a program and the like, the DeMUX processing unit 12 extracts a necessary stream (selects a packet) from multiplexed TSs. The DeMUX processing unit 12 extracts required video packet (video signal), voice packet (voice signal), packet of a Program Specific Information (PSI)/SI signal (additional information), and the like from packets of various streams. The DeMUX processing unit 12 sends the extracted SI to the SI information analyzing unit 15 and sends the extracted video signal, voice signal, and the like to the MPEG demodulating unit 13.

As information included in the SI, there are a channel number of a program present in a TS, a channel name of the program, a program name, a broadcast date and time of the program, the number of total broadcast times in case of a serial program, the number of times a program is broadcasted in a serial program, a type of a program, an explanation of program contents, and the like. For example, when a program is a serial that is broadcasted once a week for ten weeks serially, the SI includes an indication that, for example, the total number of times of broadcast is ten and this is the first time.

The MPEG demodulating unit 13 decodes the video signal and the voice signal extracted by the DeMUX processing unit 12. For example, the MPEG demodulating unit 13 decodes a video signal and a voice signal, which are encoded according to the MPEG2 standard, according to the MPEG2 standard. The video signal and the voice signal decoded by the MPEG demodulating unit 13 are sent to the display unit 14.

The SI information analyzing unit 15 analyzes the SI sent from the DeMUX processing unit 12 and sends the analyzed information to the condition setting unit 20. For example, when SI concerning a serial of a new program is confirmed, the SI information analyzing unit 15 sends this SI to the condition setting unit 20. When information instructing to start recording of a program is received from the condition setting unit 20, the SI information analyzing unit 15 judges whether the SI sent from the DeMUX processing unit 12 is SI of a program that should be recorded. When the SI information analyzing unit 15 judges that the SI is the SI of the program that should be recorded, the Si information analyzing unit 15 transmits information to the effect that the SI of the program that should be recorded is received to the tuner unit 11.

The condition setting unit 20 stores information on a program to be recorded and information on deletion of a program recorded in a storing unit 17. The condition setting unit 20 includes a recording condition setting unit 21 and a deletion condition setting unit 22.

The recording condition setting unit (a program reserving unit) 21 includes software or the like to record only broadcasts for a first predetermined number of times of a program that is broadcasted over plural times such as a serial of a new program. Recording reservation for the program is set according to a channel, a broadcast starting date and time, a broadcast ending date and time, and the like of the program.

The deletion condition setting unit 22 includes software or the like. In the deletion condition setting unit 22, a condition for deleting a program from the storing unit 17 (a deletion condition) and a priority concerning deletion in deleting a program (a deletion priority), when a program that should be recorded is set in the recording condition setting unit 21 and when a recording area for recording a program that should be recorded in the storing unit 17 is insufficient, are set.

The deletion condition is set arbitrarily based on a period in which a program is not viewed even once after recording (N days (N is a natural number)), the number of times of recording of the program (M times (M is a natural number)) at the time when a program, which is broadcasted over plural times, is recorded without being viewed even once, and the like. The deletion priority is set based on a viewing history or the like of a program by a user (a viewer) of the broadcast storage unit 1.

The recording/reproduction control unit 16 controls the tuner unit 11 and the storing unit 17 based on a setting of the recording condition setting unit 21 or an instruction from a user. The storing unit 17 includes, for example, a Hard Disk Drive (HDD). The storing unit 17 receives a TS of a program received by the tuner unit 11 via the recording/reproduction control unit 16 and stores the TS. In addition, the storing unit 17 stores a list or the like of programs stored therein. The programs stored by the storing unit 17 are deleted as required according to control of the recording/reproduction control unit 16.

The display unit 14 includes a television monitor and the like. The display unit 14 displays a video signal and a voice signal decoded by the MPEG demodulating unit 113, a list of programs, and the like. The input unit 18 is a remote controller or the like for inputting, for example, a channel number as information on a program that a user desires to view. Conditions or the like for setting the deletion priority are inputted to the input unit 18.

Figure 2:
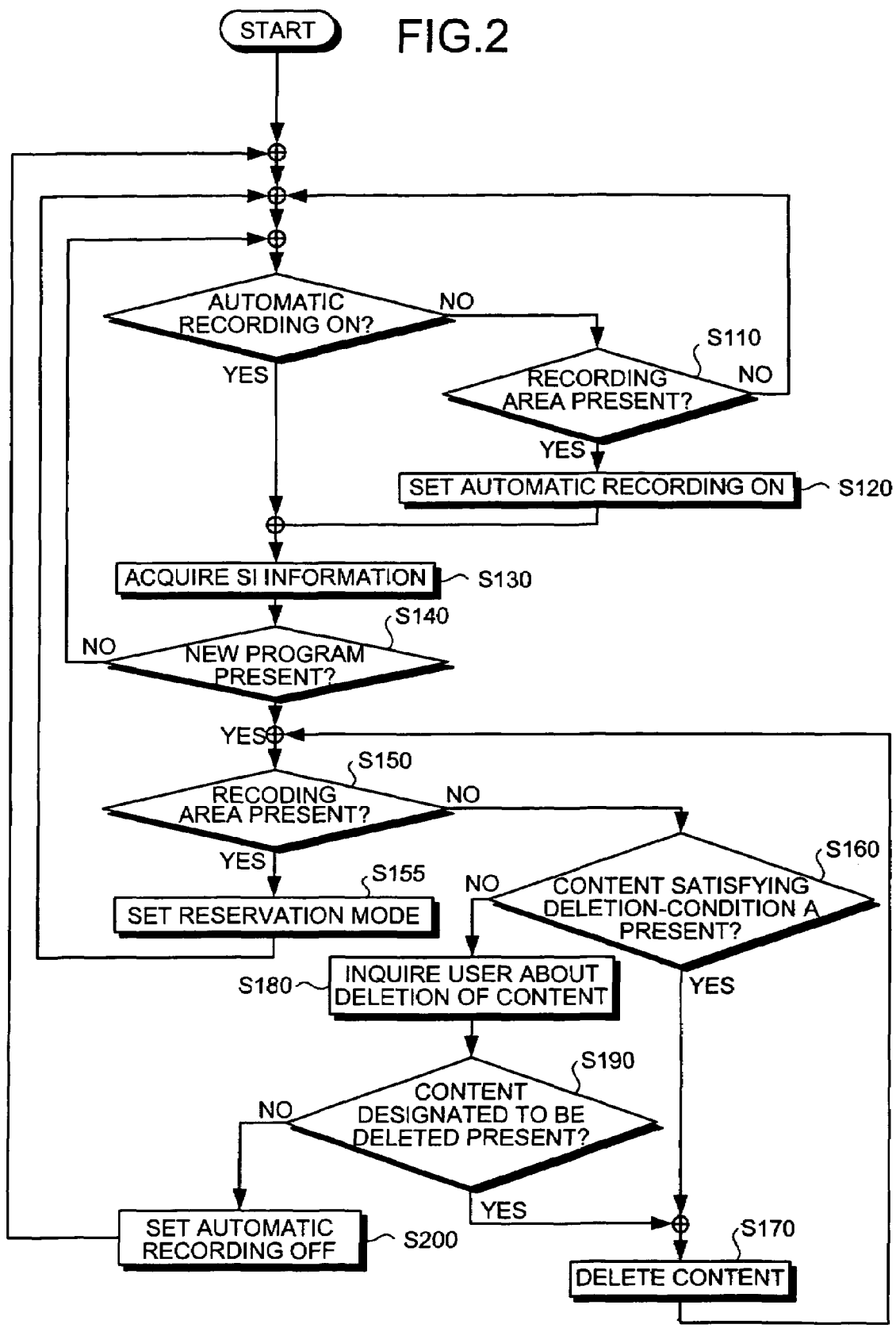
FIG. 2 is a flowchart of an operation procedure of the broadcast storage unit.

Next, an operation of the broadcast storage unit shown in FIG. 1 is explained in detail with reference to a flowchart in FIG. 2. When a program is automatically recorded, a user of the broadcast storage unit 1 inputs instruction information from the input unit 18 to turn ON automatic recording. When a program is not recorded automatically, the user inputs instruction information from the input unit 18 to turn OFF automatic recording. The instruction information inputted from the input unit 18 is sent to the condition setting unit 20. Based on this instruction information, the recording condition setting unit 21 of the condition setting unit 20 sets a condition for determining whether a program should be automatically recorded.

The recording/reproduction control unit 16 confirms whether the recording condition setting unit 21 sets a condition to automatically record a program (automatic recording ON) or not to automatically record a program (automatic recording OFF) (step S100).

When the recording/reproduction control unit 16 confirms that the recording condition setting unit 21 sets automatic recording ON ("No" at step S100), the recording/reproduction control unit 16 confirms whether a recording area for a program remains in the storing unit 17 (step S110). Here, the recording/reproduction control unit 16 corresponds to the first detection unit and the judging unit in claims.

When it is confirmed that no recording area for a program remains in the storing unit 17 ("No" at step S110), the recording/reproduction control unit 16 does not cause the recording storage unit to perform automatic recording processing for a program until it is confirmed that instruction information is inputted by the user of the broadcast storage unit 1 from the input unit 18 to turn ON automatic recording and the recording/reproduction control unit 16 confirms that the recording condition setting unit 21 sets a condition to automatically record a program or until the recording/reproduction control unit 16 confirms that a recording area for a program remains in the storing unit 17 (steps S100 to S110). When it is confirmed that a recording area for a program remains in the storing unit 17 ("Yes" at step S110), the recording/reproduction control unit 16 changes the setting of the recording condition setting unit 21 to automatic recording ON (step S120).

The recording/reproduction control unit 16 confirms that the setting of the recording condition setting unit 21 is automatic recording ON ("Yes" at step S100, or step S120), the recording/reproduction control unit 16 controls the tuner unit 11 to receive an arbitrary program including SI. The tuner unit 11 receives an arbitrary program including SI, extracts a TS from the received signal, demodulates this TS, applies error correction or the like to the TS, and then sends the TS to the DeMUX processing unit.

Figure 3:
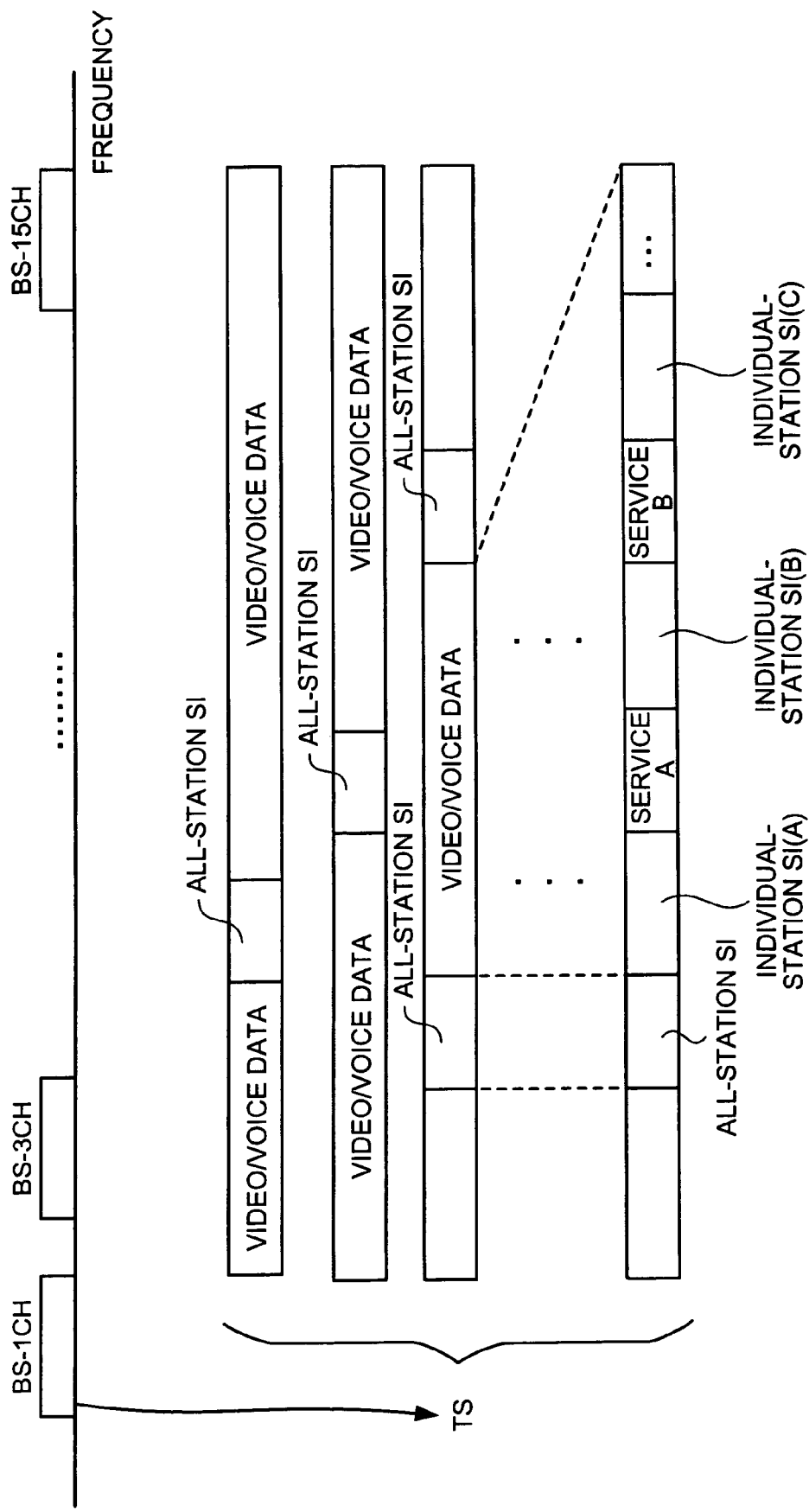
FIG. 3 is a diagram for explaining a TS transmitted by a digital broadcast.

Here, a TS transmitted by a digital broadcast is explained. FIG. 3 is a diagram for explaining a TS transmitted by a digital broadcast. Programs of plural channels having different frequencies, respectively, are transmitted (broadcasted) by transmission sources such as broadcasting companies.

When a digital broadcast is, for example, a BS digital broadcast, programs of different frequencies are transmitted for each channel like BS-1ch (channel), BS-3ch, and BS-15ch from the transmission sources. The respective channels can include maximum eight MPEG2-TSs and can transmit maximum thirty-two services with one TS.

The TS includes the video/voice data Video/voice data and all-station SI. The video/voice data includes various kinds of individual-station SI and various services. For example, the video/voice data includes individual-station IS (A), individual-station SI (B), individual-station SI (C), a service A, a service B, and the like.

The all-station SI and the individual-station SI include information such as a channel number of a program present in a TS, a channel name of the program, a program name, a broadcast date and time of the program, the number of total broadcast times in case of a serial program, the number of times a program is broadcasted in a serial program, a type of a program, and an explanation of program contents.

The DeMUX processing unit 12 extracts a necessary stream from multiplexed TSs. The DeMUX processing unit 12 extracts (acquires) a packet of an SI signal (all-station SI or individual-station SI) or the like from packets of various streams (step S130). The SI extracted in the DeMUX processing unit is sent to the SI information analyzing unit 15.

The SI information analyzing unit 15 confirms whether there is a program to be broadcasted, which is a new program such as a serial, based on the SI received from the DeMUX processing unit 12 (step S140). When there is no new program such as a serial ("No" at step S140), the recording storage unit does not perform the automatic recording until the automatic recording is turned ON and the SI information analyzing unit 15 confirms that there is a new program such as a serial based on the SI received from the DeMUX processing unit 12. On the other hand, when there is a new program such as a serial ("Yes" at step S140), the SI information analyzing unit 15 extracts SI of this program. For example, when there is a serial that is broadcasted once a week for ten weeks serially, the SI information analyzing unit 15 extracts SI for a predetermined number of times of broadcasts (e.g., first four times). The SI in this context includes information such as a channel number, a program name, and a broadcasting date and time of the program. When there is a new program such as a serial ("Yes" at step S140), the recording/reproduction control unit 16 detects a capacity necessary for recording the new program based on the SI acquired by the SI information analyzing unit 15. In addition, the recording/reproduction control unit 16 confirms whether a recording area (a residual capacity) necessary for recording the new program remains in the storing unit 17 (step S150). Here, the recording/reproduction control unit 16 includes, for example, a CPU and software controlled by the CPU. The recording/reproduction control unit 16 corresponds to the first detection unit, the second detection unit, and the judging unit in claims.

When the recording/reproduction control unit 16 judges that a recording area remains in the storing unit 17 ("Yes" at step S150), the recording/reproduction control unit 16 sends instruction information to the condition setting unit 20 to set recording reservation for a program. The recording condition setting unit 21 of the condition setting unit 20 requests the SI information analyzing unit 15 to transmit the SI extracted by the SI information analyzing unit 15 to the recording condition setting unit 21 and acquires the SI from the SI information analyzing unit 15. The recording condition setting unit 21 sets information on the recording reservation for the program (reservation mode setting) based on the SI (step S155). For example, when a drama Y, which is broadcasted from 9 pm to 10 pm on Wednesday every week for ten weeks serially, starts on an X channel from March 10, the recording condition setting unit 21 performs setting to record the drama Y on the X channel from 9 pm to 10 pm on March 10, 27, 24, and 31.

When the recording/reproduction control unit 16 judges that a predetermined capacity or more of a recording area does not remain in the storing unit 17 ("No" at step S150), the recording/reproduction control unit 16 confirms whether there is a program that is deletable from programs (contents) stored in the storing unit 17 (step S160).

The recording/reproduction control unit 16 judges whether there is a program that is stored in the storing unit 17 and is deletable based on the deletion condition and the deletion priority set in the deletion condition setting unit 22 of the condition setting unit 20.

The deletion condition is set based on conditions such as a program recorded by automatic recording, a period in which a program is not viewed even once after being recorded in the storing unit 17 (N days (N is a natural number)), and the number of times of recording of a program such as a serial (M times (M is a natural number)) at the time when the serial is recorded without being viewed even once.

As the period in which a program is not viewed even once after being recorded in the storing unit 17, for example, "thirty days" is inputted to the deletion condition setting unit 22 in advance via the input unit 18. As the number of times of recording of a program such as a serial at the time when the serial is recorded without being viewed even once, for example, "three times" is inputted to the deletion condition setting unit 22 via the input unit 18. Consequently, a program, which has not been viewed for thirty days after being recorded in the storing unit 17, and a program, which has not been viewed even once regardless of the fact that a first broadcast to a third broadcast were recorded, are deletable programs.

The deletion condition setting unit 22 sets, for example, a program, which was recorded by automatic recording and has not been viewed even once for thirty days after being recorded in the storing unit 17, as a condition D1 for a deletable program. In addition, the deletion condition setting unit 22 sets, for example, a program, which was recorded by automatic recording and a recording number of times of which is three times at the time when the program is a program such as a serial that is recorded without being viewed even once, as a condition D2 for a deletable program. Further, the deletion condition setting unit 22 sets, for example, a program, which is permitted to be deleted when a storage capacity in the storing unit 17 runs short, as a condition D3 for a deletable program.

The deletion condition setting unit 22 may set a priority of deletion with respect to the conditions D1 to D3 for a deletable program. Moreover, the deletion condition setting unit 22 may set a priority for deletion of programs based on a viewing history of programs by a user of the broadcast storage unit 1. In this case, the broadcast storage unit 1 determines a priority of programs to be deleted from programs stored in the storing unit 17 based on information, for example, the user tends to view samurai dramas as a type of a program, often views serials of a certain broadcasting station, or often views dramas in a certain time frame.

For example, the SI information analyzing unit 15 analyzes SI processed by the DeMUX processing unit 12, whereby information on contents of a program viewed by the user of the broadcast storage unit 1 (viewing history) is obtained. Here, the SI information analyzing unit 15 corresponds to a viewing history storing unit in claims.

When the deletion condition setting unit 22 judges that, for example, the user of the broadcast storage unit 1 tends to view samurai dramas among broadcasted programs according to the SI analyzed by the SI information analyzing unit 15, the deletion condition setting unit 22 sets a priority for deletion of programs such that the priority is high for programs other than samurai dramas among the programs stored in the storing unit 17.

The recording/reproduction control unit 16 accesses the storing unit 17 and the deletion condition setting unit 22. When it is judged that programs satisfying the conditions D1 to D3 for a deletable program are included in the storing unit 17 ("Yes" at step S160), the recording/reproduction control unit 16 judges which program should be deleted preferentially in the storing unit 17.

When the deletion condition setting unit 22 sets an order of a deletion priority as the conditions D3, D2, and D1 for a deletable program and when it is necessary to delete a program from the storing unit 17, the recording/reproduction control unit 16 deletes a program satisfying the condition D3 for a deletable program from the storing unit 17 first (step S170). At this point, when there are plural programs satisfying the condition D3 for a deletable program, the recording/reproduction control unit 16 determines a program to be deleted from the storing unit 17 based on the deletion priority that is set according to the viewing history of programs. For example, the recording/reproduction control unit 16 deletes programs other than samurai dramas from the storing unit 17 first.

When the programs other than samurai dramas are deleted from the storing unit 17, the recording/reproduction control unit 16 confirms whether a recording area remains in the storing unit 17 (step S150). When it is necessary to further delete a program from the storing unit 17 ("No" at step S150), the recording/reproduction control unit 16 deletes samurai dramas satisfying the condition D1 for a deletable program from the storing unit 17 (steps S160 and S170).

When a program is deleted from the storing unit 17, the recording/reproduction control unit 16 confirms whether a recording area remains in the storing unit 17 again (step S150). When it is necessary to further delete a program from the storing unit 17 ("No" at step S150), the recording/reproduction control unit 16 deletes a program satisfying the condition D2 for a deletable program from the storing unit 17 (steps S160 and S170). When it is necessary to further delete a program from the storing unit 17 ("No" at step S150), the recording/reproduction control unit 16 deletes a program satisfying the condition D2 for a deletable program from the storing unit 17 (steps S160 and S170).

When the deletion condition setting unit 22 sets the priority of the conditions D1 to D3 for a deletable program as identical and when it is necessary to delete a program from the storing unit 17 ("No" at step S150), the recording/reproduction control unit 16 deletes all programs satisfying the conditions D1 to D3 for a deletable program from the storing unit 17 simultaneously (steps S160 and S170).

The recording/reproduction control unit 16 accesses the storing unit 17 and the deletion condition setting unit 22. When it is judged that a program satisfying the conditions D1 to D3 for a deletable program is not included in the storing unit 17 ("No" at step S160), the recording/reproduction control unit 16 inquires the user of the broadcast storage unit 1 whether there is a program that may be deleted (erased) among the programs stored in the storing unit 17. The recording/reproduction control unit 16 transmits instruction information for causing the display unit 14 and other display devices (not shown) to display an inquiry of a content indicating that "is there a program that may be deleted among programs stored in the storing unit 17?" The display unit 14 and the other display devices display the inquiry of the content indicating that "is there a program that may be deleted among programs stored in the storing unit 17?" (step S180). At this point, the recording/reproduction control unit 16 causes the display unit 14 to display a list of programs or the like stored in the storing unit 17. The user of the broadcast storage unit 1 confirms the content displayed on the display unit 14.

When the user of the broadcast storage unit 1 judges that there is a program that may be deleted among the programs stored in the storing unit 17, the user designates the program, which may be deleted, via the input unit 18. On the other hand, when the user of the broadcast storage unit 1 judges that there is no program that may be deleted among the programs stored in the storing unit 17, the user inputs instruction information to the effect that a program is not deleted to the input unit 18.

The input unit 18 sends the information inputted by the user to the recording/reproduction control unit 16. The recording/reproduction control unit 16 confirms whether a program that may be deleted is designated by the user of the broadcast storage unit 1 (step S190).

When the recording/reproduction control unit 16 confirms that a program that may be deleted is designated by the user of the broadcast storage unit 1, the recording/reproduction control unit 16 deletes the designated program from the storing unit 17 (step S170).

On the other hand, when the recording/reproduction control unit 16 confirms that instruction information to the effect that a program is not deleted is inputted by the user of the broadcast storage unit 1, the recording/reproduction control unit 16 changes the setting of the recording condition setting unit 21 to automatic recording OFF (step S200). Thereafter, automatic recording processing is not performed until, for example, the user of the broadcast storage unit 1 turns automatic recording ON to change the setting of the recording condition setting unit 21 to automatic recording ON.

When the program is deleted from the storing unit 17 and the recording/reproduction control unit 16 confirms that a predetermined capacity or more of a recording area remains in the storing unit 17 ("Yes" at step S150), the recording condition setting unit 21 sets information on recording reservation of a program (reservation mode) based on SI from the SI information analyzing unit 15 (step S155).

Thereafter, recording of a program is performed based on the setting for recording reservation for the program in the recording condition setting unit 21. When a recording starting date and time of the program set in the recording condition setting unit 21 has come, the recording condition setting unit 21 sends instruction information to the recording/reproduction control unit 16 to record the program. The instruction information includes a channel number of the program, a recording starting time of the program, a recording ending time of the program, and the like. In addition, when the recording starting date and time of the program set in the recording condition setting unit 21 has come, the recording condition setting unit 21 sends instruction information to the SI information analyzing unit 15 to start analysis of SI. The instruction information includes identification information and the like of the program that is reserved for recording.

The recording/reproduction control unit 16, which receives the instruction information from the recording condition setting unit 21, sends instruction information to the tuner unit 11 to receive the program that is reserved for recording. The tuner unit 11 selects a broadcast (a signal) of a channel instructed by the recording/reproduction control unit 16 and receives the broadcast.

The tuner unit 11 extracts a TS from the received signal, demodulates the TS, applies error correction or the like to the TS, and then sends the TS to the DeMUX processing unit 12. The DeMUX processing unit 12 extracts information for identifying the program of the individual-station SI or the like from the TS and sends the information to the SI information analyzing unit 15. The SI information analyzing unit 15 judges whether the information from the DeMUX processing unit 12 is the program, which is reserved for recording, based on the identification information of the program that is reserved for recording. When the SI information analyzing unit 15 judges that the program being received is the program that is reserved for recording, the SI information analyzing unit 15 sends instruction information to the tuner unit 11 to transmit the program to the recording/reproduction control unit 16. The tuner unit 11 extracts a TS from the received signal, demodulates the TS, applies error correction or the like to the TS, and then sends the TS to the storing unit 17 via the recording/reproduction control unit 16. The storing unit 17 stores the TS from the tuner unit 11.

When the user of the broadcast storage unit 1 views a program stored by the storing unit 17, the user of the broadcast storage unit 1 inputs information to the effect that the viewer views the program from the input unit 18. The input unit 18 sends the information to the effect that the user views the program to the recording/reproduction control unit 16. The recording/reproduction control unit 16 causes the display unit 14 to display the list of programs or the like stored in the storing unit 17.

The user of the broadcast storage unit 1 confirms a content displayed on the display unit 14, selects a desired program from the list, and inputs designation information for designating the selected program to the input unit 18.

The input unit 18 transmits the designation information of the program to the recording/reproduction control unit 16. The recording/reproduction control unit 16 extracts the program designated by the user out of the programs stored in the storing unit 17 based on the designation information. The recording/reproduction control unit 16 sends a TS of the program extracted from the storing unit 17 to the DeMUX processing unit 12. The DeMUX processing unit 12 extracts a necessary stream from multiplexed TSs. The DeMUX processing unit 12 extracts required video packet, voice packet, packet of an SI signal, and the like from packets of various streams. The video packet, the voice packet, and the packet of the SI signal extracted in the DeMUX processing unit 12 are sent to the MPEG modulating unit 13. The MPEG modulating unit 13 decodes a video signal and a voice signal and a program is displayed on the display unit 14.

The program displayed on the display unit 14 is deleted from the storing unit 17. When the video packet, the voice packet, the packet of the SI signal, and the like are extracted based on the TS from the storing unit 17 to acquire a viewing history of programs or when the video packet, the voice packet, the packet of the SI signal, and the like are extracted based on the TS from the tuner unit 11, the DeMUX processing unit 12 sends the extracted packet of the SI signal to the SI information analyzing unit 15. The SI information analyzing unit 15 analyzes this SI signal and sends information such as a type of a program and a channel name to the deletion condition setting unit 22. The deletion condition setting unit 22 acquires information from the SI information analyzing unit 15 as a viewing history and sets a priority for program deletion based on this viewing history.

Note that, when a program in the storing unit 17 is viewed by the user of the broadcast storage unit 1 and this program is deleted from the storing unit 17, a recording area in the storing unit 17 increases. Thus, the setting of the recording condition setting unit 21 is changed to automatic recording ON to perform the same processing from step S100.

When a program is deleted from the storing unit 17 by the user of the broadcast storage unit 1, since a recording area increases in the storing unit 17, the setting of the recording condition setting unit 21 is changed to automatic recording ON to perform the same processing from step S100.

Note that the user of the broadcast storage unit 1 can set conditions for a deletable program and a priority for program deletion arbitrarily. The deletion of a program from the storing unit 17 is performed not only immediately after it is confirmed by the SI information analyzing unit 15 that there is a new program such as a serial but also immediately before the new program such as a serial is stored in the storing unit 17.

In the first example, a TS of a program, which is reserved for recording, is stored in the storing unit 17. However, a video packet and a voice packet of the program may be stored in the storing unit 17.

In the first example, a priority for program deletion is set based on a viewing history of the user of the broadcast storage unit 1. However, when plural new programs and the like are broadcasted at an identical date and time, a priority for program recording may be set based on a viewing history of the user of the broadcast storage unit 1.

In this way, according to the first example, broadcasts for a predetermined number of times from a first broadcast of a new program, which is broadcasted serially, are recorded automatically based on an SI. Thus, it is possible to view the new program, which is broadcasted serially, from a first broadcast. In addition, a program, which is judged unnecessary, among programs stored in the storing unit 17 is automatically deleted. Thus, it is possible to store programs necessary for a viewer efficiently.

Next, a second example of the invention is explained with reference to FIG. 4. In the second example, information on a program to be broadcasted is acquired from an EPG and broadcasts for a first predetermined number of times of a new program, which is broadcasted over plural times, are automatically recorded based on the EPG. Note that, in the second example, again, a digital broadcast wave is received. However, the invention is not always limited to the implementation in this form and can also be carried out in a broadcast storage unit that receives an analog broadcast wave.

Figure 4:
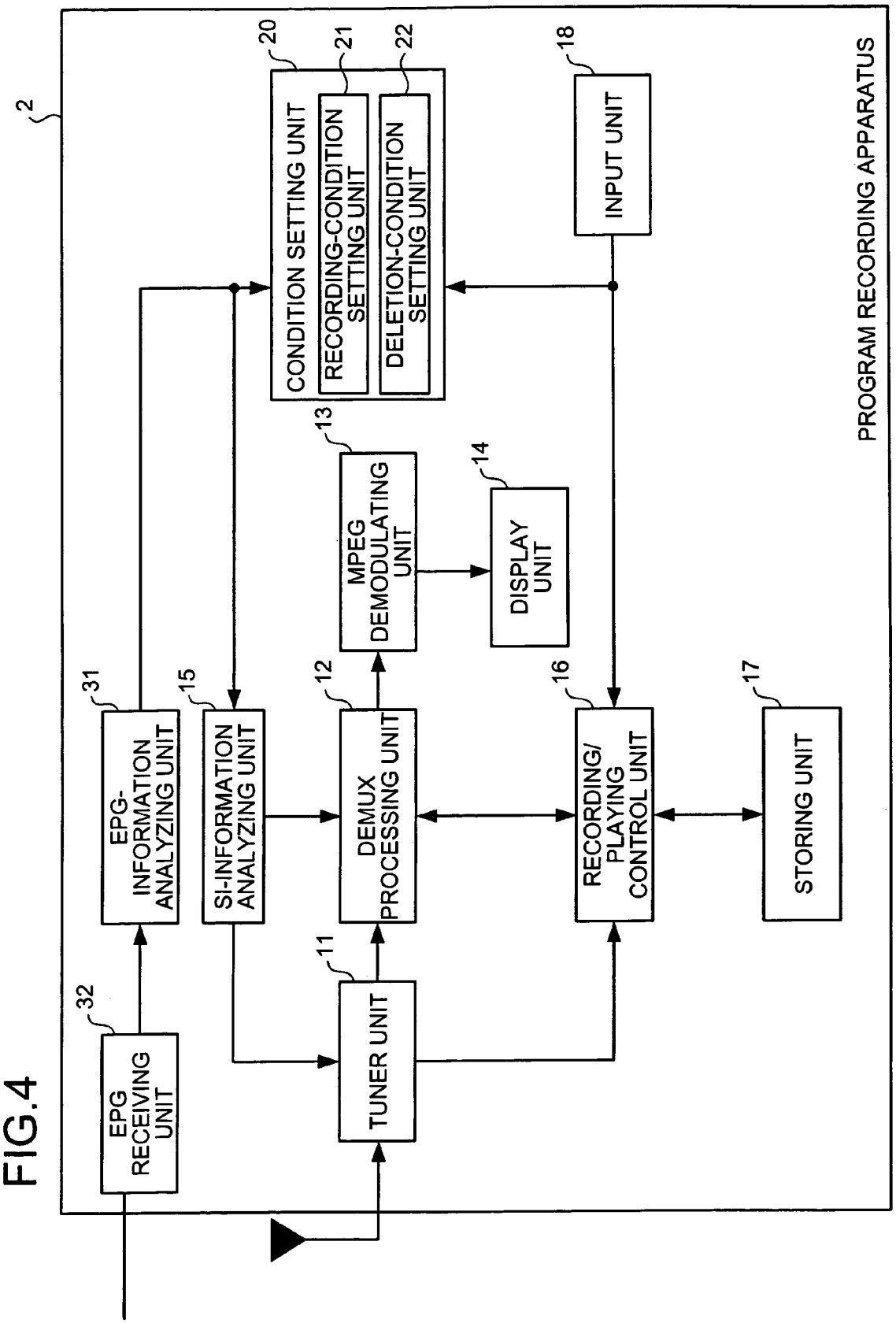
FIG. 4 is a block diagram of a structure of a broadcast storage unit according to a second example of the invention.

FIG. 4 is a block diagram of a structure of a broadcast storage unit according to the second example of the invention. Among components in FIG. 4, components attaining the identical functions as those of the broadcast storage unit 1 in the first example shown in FIG. 1 are denoted by the identical reference numerals and are not explained repeatedly.

A broadcast storage unit 2 is a unit that receives digital broadcast waves and records video data and voice data. The broadcast storage unit 2 includes the tuner unit 11, the Demulti-plexer (DeMUX) processing unit 12, the Motion Picture Expert Group (MPEG) demodulating unit 13, the display unit 14, the SI information analyzing unit 15, the recording/reproduction control unit 16, the storing unit 17, the input unit 18, the condition setting unit 20, an EPG receiving unit (interface) 32, and an EPG information analyzing unit 31.

The EPG receiving unit 32 receives information such as a list of programs to be broadcasted. The EPG receiving unit 32 receives an EPG via, for example, the Internet. The EPG includes information such as a channel number of a program to be broadcasted, a channel name of the program, a program name, a broadcast date and time of the program, the number of total broadcast times in case of a serial program, the number of times a program is broadcasted in a serial program, a type of a program, and an explanation of program contents.

The EPG information analyzing unit 31 analyzes the EPG received by the EPG receiving unit 32 and extracts information on programs to be broadcasted. The EPG information analyzing unit 31 confirms, for example, whether there is a new program such as a serial in the programs to be broadcasted based on the EPG. When the EPG information analyzing unit 31 confirms that there is a new program such as a serial based on the EPG, the EPG information analyzing unit 31 sends information on this new program to the condition setting unit 20.

In the second example, after acquiring information on programs to be broadcasted from the EPG, broadcasts for a first predetermined number of times of a new program, which is broadcasted over plural times, are recorded automatically according to the same processing as the broadcast storage unit 1 in the first example. The recording/reproduction control unit 16 confirms whether automatic recording ON is set or automatic recording OFF of a program in the recording condition setting unit 21.

When the recording/reproduction control unit 16 confirms that automatic recording OFF is set in the recording condition setting unit 21, the recording/reproduction control unit 16 confirms whether a recording area for a program remains in the storing unit 17. When it is confirms that a recording area for a program remains in the storing unit 17, the setting of the recording condition setting unit 21 is changed to automatic recording ON.

When the recording/reproduction control unit 16 confirms that the setting of the recording condition setting unit 21 is automatic recording ON, the recording/reproduction control unit 16 controls the EPG receiving unit 32 to receive an EPG.

The EPG receiving unit 32 receives the EPG via the Internet or the like and sends the EPG to the EPG information analyzing unit 31. The EPG includes information such as a channel number of a program to be broadcasted, a channel name of the program, a program name, a broadcast date and time of the program, the number of total broadcast times in case of a serial program, the number of times a program is broadcasted in a serial program, a type of a program, and an explanation of program contents. The EPG information analyzing unit 31 extracts these kinds of information.

The EPG information analyzing unit 31 confirms whether there is a new program such as a serial that is a program to be broadcasted. When there is no new program such as a serial, the recording storage unit 2 does not perform the automatic recording until the automatic recording is turned ON and the EPG information analyzing unit 31 confirms that there is a new program such as a serial. On the other hand, when there is a new program such as a serial, the EPG-information analyzing unit 15 extracts EPG (information for the program) of this program. For example, when there is a serial that is broadcasted once a week for ten weeks serially, the SI-information analyzing unit 15 extracts the information for the program for a predetermined number of times of broadcasts (e.g., first four times). The EPG in this context includes information such as a channel number, a program name, and a broadcasting date and time of the program.

When there is a new program such as a serial, the recording/playing control unit 16 detects confirms whether a recording area necessary for recording the new program remains in the storing unit 17. When the recording/playing control unit 16 judges that a recording area remains in the storing unit 17, the recording/playing control unit 16 sends instruction information to the condition setting unit 20 to set recording reservation for a program. The recording-condition setting unit 21 of the condition setting unit 20 requests the EPG-information analyzing unit 31 to transmit the information for the program extracted by the EPG-information analyzing unit 31 to the recording-condition setting unit 21 and acquires the information for the program from the EPG-information analyzing unit 31. The recording-condition setting unit 21 sets information on the recording reservation for the program based on the information for the program. When the recording/playing control unit 16 judges that a predetermined capacity or more of a recording area does not remain in the storing unit 17, the recording/playing control unit 16 confirms whether there is a program that is deletable from programs stored in the storing unit 17.

The recording/reproduction control unit 16 deletes the deletable program from the storing unit 17. At this point, the recording/reproduction control unit 16 deletes the program from the storing unit 17 based on a deletion condition and a deletion priority. The recording/playing control unit 16 accesses the storing unit 17 and the deletion-condition setting unit 22. When it is judged that a deletable program is not included in the storing unit 17, the recording/playing control unit 16 inquires the user of the program recording apparatus 1 whether there is a program that may be deleted among the programs stored in the storing unit 17. The recording/playing control unit 16 displays an inquiry of a content indicating that "is there a program that may be deleted among programs stored in the storing unit 17?" on display unit 14.

When the user of the program recording apparatus 1 judges that there is a program that may be deleted among the programs stored in the storing unit 17, the user designates the program, which may be deleted, via the input unit 18. On the other hand, when the user of the program recording apparatus 1 judges that there is no program that may be deleted among the programs stored in the storing unit 17, the user inputs instruction information to the effect that a program is not deleted to the input unit 18.

When the recording/playing control unit 16 confirms that a program that may be deleted is designated by the user of the program recording apparatus 1, the recording/playing control unit 16 deletes the designated program from the storing unit 17. On the other hand, when the recording/playing control unit 16 confirms that instruction information to the effect that a program is not deleted is inputted by the user of the program recording apparatus 1, the recording/playing control unit 16 changes the setting of the recording-condition setting unit 21 to automatic recording OFF.

When the program is deleted from the storing unit 17 and the recording/playing control unit 16 confirms that a predetermined capacity or more of a recording area remains in the storing unit 17, the recording-condition setting unit 21 sets information on recording reservation of a program based on the information for the program from the EPG-information analyzing unit 31.

Thereafter, recording of the program is performed based on the setting for recording reservation for the program in the recording condition setting unit 21. Then, the program stored in the storing unit 17 is reproduced as required by the user in the same manner as the broadcast storage unit 1 in the first example. In addition, the program stored in the storing unit 17 is deleted as required. Note that the EPG does not always have to be received via the Internet and may be acquired form a program or the like that is broadcasted digitally.

In this way, according to the second example, broadcasts for a predetermined number of times from a first broadcast of a new program, which is broadcasted serially, are recorded automatically based on an EPG. Thus, it is possible to view the new program, which is broadcasted serially, from a first broadcast.

Note that, in this example, the storage unit, which stores a digital broadcast, is explained. However, it is needless to mention that the invention is also applicable to a storage unit that receives and stores a television broadcast by an ordinary analog broadcast wave. In that case, it is possible that the storage unit according to the invention includes a network interface such as a LAN as an information acquiring unit, acquires an EPG via the Internet or the like, and automatically records broadcasts for a first predetermined number of times of a new program, which is broadcasted over plural times, based on the EPG.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A program recording apparatus comprising:
   an information acquiring unit that acquires program information concerning a program to be broadcasted;
   a determining unit that determines, from the acquired program information, whether the program is a new fragmented program which is divided into a series of airings;
   a program reserving unit that automatically programs, when the program is a new fragmented program, recordings of a predetermined number of initial airings of the new fragmented program, based on the acquired program information; and
   a storage medium on which programs are recorded.

2. The program recording apparatus according to claim 1, wherein the program information includes at least
   identification information for a channel through which the program is broadcasted; and
   information indicating date and time of starting a broadcast of the program and date and time of ending the broadcast.

3. The program recording apparatus according to claim 1, further comprising an interface for receiving the program information via a network.

4. The program recording apparatus according to claim 1, wherein
   the broadcast is a digital broadcast in which additional information including the program information is transmitted with video and audio information, and
   the determining unit utilizes the additional information.

5. The program recording apparatus according to claim 1, further comprising:
   a first detecting unit that detects a remaining recording capacity of the storage medium;
   a second detecting unit that detects a size of the program for which the recordings of the predetermined number of initial airings is performed;
   a judging unit that judges whether the remaining recording capacity is smaller than the size of the program for which the recordings of the predetermined number of initial airings is performed; and
   a deletion control unit that deletes, when the judging unit judges that the remaining recording capacity is smaller than the size of the program for which the recordings of the predetermined number of initial airings is performed, a recorded program from the storage medium according to predetermined deletion conditions.

6. The program recording apparatus according to claim 5, further comprising a deletion-condition setting unit that sets a priority order of deletion to the recorded program based on the acquired program information concerning the recorded program.

7. The program recording apparatus according to claim 6, further comprising a view-history storing unit that stores a view history which includes information on a category, start and end times, and a station ID of each of programs viewed by a user, wherein
   the deletion-condition setting unit sets the priority order based on the view history.

8. A program recording method comprising:
   acquiring program information concerning a program to be broadcasted;
   determining, from the acquired program information, whether the program is a new fragmented program which is divided into a series of airings;
   automatically programming, when the program is a new fragmented program, recordings of a predetermined number of initial airings of the new fragmented program, based on the acquired program information; and
   recording, in a storage medium, the program for which a recording is automatically programmed.

9. The method according to claim 8, wherein the program information includes at least:
   identification information for a channel through which the program is broadcasted; and
   information indicating date and time of starting a broadcast of the program and date and time of ending the broadcast.

10. The method according to claim 8, further comprising:
    receiving, via an interface, the program information via a network.

11. The method according to claim 8, wherein
    the broadcast is a digital broadcast in which additional information including the program information is transmitted with video and audio information, and
    the determining step utilizes the additional information.

12. The method according to claim 8, further comprising:
    detecting a remaining recording capacity of the storage medium;
    detecting a size of the program for which the recordings of the predetermined number of initial airings is performed;
    judging whether the remaining recording capacity is smaller than the size of the program for which the recordings of the predetermined number of initial airings is performed; and
    deleting, when the judging step judges that the remaining recording capacity is smaller than the size of the program for which the recordings of the predetermined number of initial airings is performed, a recorded program from the storage medium according to predetermined deletion conditions.

13. The method according to claim 12, further comprising:
    setting a priority order of deletion to the recorded programs based on the program information concerning the recorded programs.

14. The method according to claim 13, further comprising:
    storing a view history which includes information on a category, start and end times, and a station ID of each of programs viewed by the user, wherein
    the setting step sets the priority order based on the view history.

\* \* \* \* \*